June 17, 1947.  O. R. NEMETH  2,422,310
FILM SHOE
Filed May 22, 1944
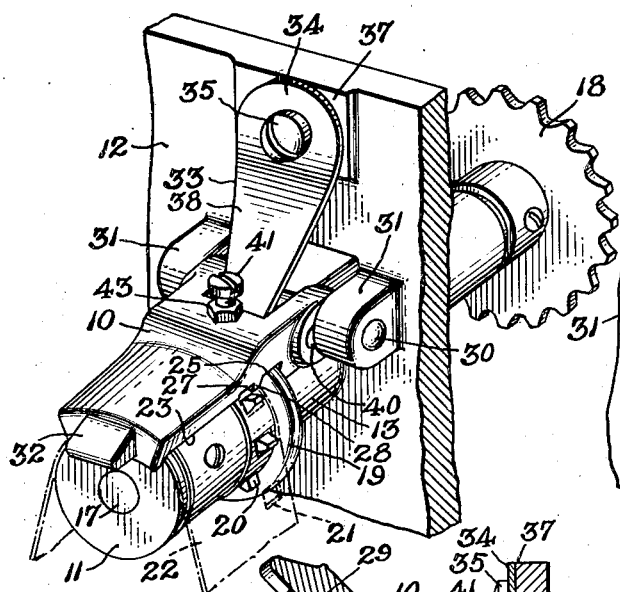
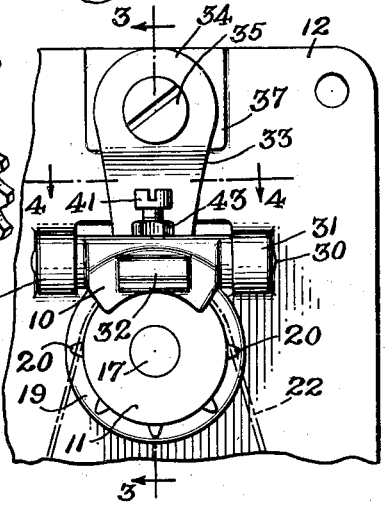
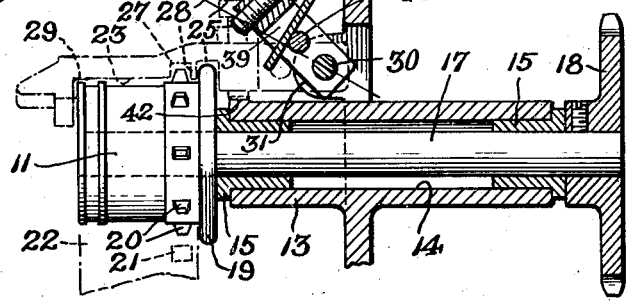
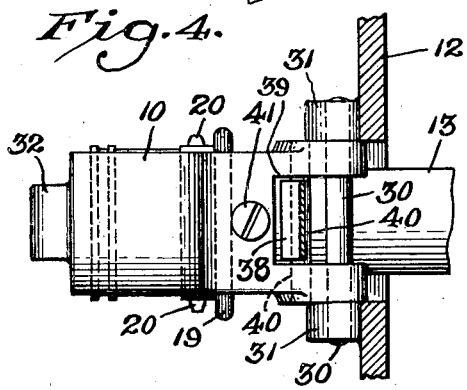
Inventor
Otto R. Nemeth
By
R. J. Schwarz
Attorney.

Patented June 17, 1947

2,422,310

UNITED STATES PATENT OFFICE 2,422,310

FILM SHOE

Otto R. Nemeth, Chicago, Ill., assignor, by mesne assignments, to Helene Curtis Industries, Inc., a corporation of Illinois Application May 22, 1944, Serial No. 536,726

4 Claims. (Cl. 271—2.3)

This invention relates to improvements in moving picture apparatus and more particularly concerns a novel film shoe construction for maintaining a film strip in place upon an associated film sprocket.

An important object of the present invention is to provide a new and improved film shoe construction of simple, durable and compact construction and which is exceptionally efficient and convenient for the intended purpose.

Another object is to provide a film shoe which in the open or non-operating condition assumes a position behind the film path and affords maximum working clearance at the front of the film sprocket, thus greatly facilitating threading of the film. Hence, the invention sharply distinguishes from constructions in which the film shoe is moved only radially or tangentially away from the film sprocket a limited distance resulting in a crowded condition of the apparatus and obstructing freedom of manipulation of the film or of access to other mechanism in the vicinity of the film sprocket.

Another object resides in the provision of improved means for positively retaining the film shoe in operating or non-operating position but enabling quick and easy manipulation of the film shoe into either of such positions.

Still another object of the invention is to provide a film shoe which is adjustable with respect to its operative approach to the film sprocket.

A further object is to provide an improved film shoe construction involving a minimum number of simple components which are particularly susceptible of low cost quantity production methods of manufacture.

Other objects, features, and advantages of the invention will be apparent from the following description and the accompanying sheet of drawings in which:

Figure 1 is a perspective view of a film shoe and film sprocket assembly embodying the features of the present invention.

Fig. 2 is a front elevational view of the film shoe and sprocket assembly.

Fig. 3 is a longitudinal vertical sectional view through the film shoe and sprocket assembly taken substantially in the plane of line 3—3 of Fig. 2 but showing the film shoe in the open or non-operating position.

Fig. 4 is a horizontal sectional view taken substantially in the plane of line 4—4 of Fig. 2.

Having more particular reference to the drawing, the specific embodiment of the invention selected for illustration is especially adapted for use in the relatively small home type of projector such as employs 16 mm. film, but obviously the invention can be employed with film of any size by exercise of simple mechanical adaptation.

According to the invention, a film shoe 10 is cooperatively associated with a film sprocket 11, and both are operatively mounted to project out from a mounting plate 12. The latter may be a casting having an integral journal boss 13 projecting to opposite sides of the plate and provided with an axial bore 14. Bearings 15 may be press fitted into the opposite ends of the bore 14. A shaft 17 rotatably supported by the bearings 15 extends beyond the opposite ends of the boss 13 and carries the film sprocket 11 keyed onto its front end while a driving pinion or sprocket gear 18 is keyed to the opposite end of the shaft. Power for driving the shaft 17 and thereby the sprocket 11 rotatably is transmitted through the gear 18 in any suitable manner as by means of a chain (not shown). As best seen in Fig. 3, the portion of the journal boss 13 extending to the front of the mounting plate 12 affords a substantial operating clearance between the adjacent face of the mounting plate and the adjacent end of the film sprocket 11.

At its inner end the sprocket 11 has a radial film locating and retaining flange 19, forwardly of but adjacent to which is a series of radial sprocket teeth 20 adapted to engage in conventional marginal sprocket apertures 21 in a film strip 22 threaded over the sprocket. In this instance, the film sprocket 11 is designed to handle sound track film.

By preference, the film shoe 10 is in the form of an elongated plate adapted to lie in centered longitudinally parallel relation to the axis of the film sprocket 11 when in film holding relation to the sprocket. To this end, the film shoe is formed with a transversely concave undercut 23, having a curvature which is complementary to and concentric with the sprocket 11 in the operating position of the shoe. The length of the undercut 23 is slightly greater than the length of the sprocket 11, and the outer or front end wall defining the undercut provides, in effect, a retaining flange 24 opposing the adjacent edge of the film strip 22. Parallel grooves 25 and 27 formed in the rear margin of the concave undercut 23 afford clearance for the sprocket flange 19 and the sprocket teeth 20, respectively. Between the grooves 25 and 27 and adjacent to the retaining flange 24 are provided narrow outwardly projecting arcuate hold-down shoulders 28 and 29, respectively, which project concentrically slightly from the main recessed arcuate surface of the undercut 23 to oppose the extreme margins of the film strip 22 and confine the film 22 to or quite close to the periphery of the film sprocket 11. Thus the film 22 is guided for travel substantially centered in the film track.

By reference to Fig. 2 it will be observed that the width of the film shoe 10, or more properly the arc of the concave undercut 23 is preferably equal to and opposes a section of roughly from one-fourth to one-third of the circumference of the sprocket. This affords quite ample film retaining or confining area in the shoe while at the same time affording ample freedom for substantial range in the preferred tangential angles of approach or recession of the film. Additional tolerance in this respect is contributed by preferably smooth ogee curved contouring to the longitudinal edges of the shoe.

Adjacent to its rear end the film shoe 10 is hingedly mounted upon the mounting plate 12 to enable swinging the shoe into and out of film holding relations to the film sprocket 11. For this purpose a hinge pin 30 extends transversely through the rear end of the film shoe 10 and through a pair of spaced hinge lugs or ears 31 formed integral with the mounting plate 12 and appropriately located to project forwardly and receive the film shoe in longitudinally medially centered relation to the film sprocket.

In order to facilitate swinging the film shoe into and out of operative position, an integral forwardly projecting handle or finger hold 32 may be provided at the forward end of the film shoe.

Although the film shoe 10 is freely hinged, its swinging movement is suitably controlled in an improved manner through the medium of a leaf type tension spring 33. Herein the spring 33 is formed with an enlarged mounting head 34 which is appropriately apertured to receive the shank of a securing screw 35 by which the spring is fastened against a mounting pad 37 on the mounting plate 12 in centered relation adjacent to the rear end of the film shoe 10. Extending at a preferably outwardly slanting angle from the mounting head 34 of the spring is an integral tension leg 38 which projects into a spring clearance recess or cut out 39 bifurcating the rear end portion of the film shoe 10. Traversing this bifurcation 39 forwardly of the hinge pin 30 but relatively close to the latter is abutment means such as a pin 40 against which the free end portion of the spring tension leg 38 bears with constant resilient pressure. The location of the abutment pin 40 relative to the spring tension leg 38, and the approach of the spring tension leg to the abutment pin are such that in the closed or operative film-retaining position of the film shoe 10, as seen in Figs. 1, 3 (broken line position) and 4, the spring pressure against the pin 40 is translated into an over-center force tending to urge the film shoe about its hinge pivot firmly toward the film sprocket 11. This positively, though resiliently, maintains the film shoe in the operative position.

When the film shoe 10 is swung away from the film sprocket 11 for film threading purposes or the like, the abutment pin 40 also swings on a short arc about the axis of the hinge pin 30, and after the film shoe has been opened to the extent that the pin 40 passes beyond the center of resilient force as indicated by the line C in Fig. 3, the spring 33 holds the film shoe open. The film shoe 10 will then be retained in the open position until pushed back to the operating overcenter side of the line C whereupon the spring tension acts to snap the film shoe closed.

Although the primary function of the film shoe 10 is to hold the film strip 22 in close engagement with the film sprocket 11, the shoe-sprocket inter-relationship must be free from drag, such as would be imposed by the relatively stationary film shoe were it to press against the film upon the sprocket under the influence of the spring 33. Accordingly, stop means is provided for maintaining the film shoe 10 operatively spaced from the periphery of the film sprocket to afford clearance for the film to move freely between the film shoe and the sprocket while nevertheless confining the film close to the sprocket. Herein such means comprises a stop element 41 in the form of an adjustment screw threaded perpendicularly through the film shoe 10 intermediate the flange groove 25 and the spring clearance 39 and adapted to abut against a bearing pad 42 on the adjacent surface of the journal boss 13. Through the medium of the adjustment stop screw 41, an optimum film clearance spacing can be attained between the film sprocket 11 and the film-opposing shoulders 28 and 29 of the film shoe. Such spacing should, of course, be conditioned to accommodate a film splice. Any adjusted condition of the stop screw 41 can be maintained by means of a lock nut 43.

By preference, the adjustment stop screw 41 serves also to stop or delimit the fully open position of the film shoe 10. For this the head of the screw 41 is preferably so disposed relative to the tension spring 33 that when the film shoe 10 is swung far enough open the head of the screw may engage the adjacent face of the spring and resist further opening of the shoe.

While I have illustrated and described a certain preferred embodiment of my invention, it is to be understood that I do not thereby intend to limit my invention to the specific form disclosed, but contemplate that various modifications, substitutions, and alternative constructions may be effected without departing from the spirit and scope of the invention as defined in the appended claims:

I claim:

1. In combination in a film shoe construction, a film shoe body including means for cooperation with a film sprocket to hold a film strip in place upon the sprocket, means for hingedly mounting the shoe for swinging into and out of operative positions relative to the film sprocket, an opening in said body adjacent to said hinge means, an elongated leaf spring adapted to be mounted adjacent to the hinge mounting of the shoe and having a tension leg adapted to extend into said opening, and means in said opening providing a bearing for said tension leg to receive resilient thrust therefrom operative to hold the shoe in open or closed position when the shoe is selectively moved into either of said positions.

2. A film shoe construction as defined in claim 1 in which the shoe body is of elongated form and bifurcated to provide said opening and the bearing means comprises a pin extending across the bifurcation.

3. In combination in a film guiding construction of the character described, a film sprocket, a film shoe cooperative with the sprocket to confine a film strip closely to the sprocket in running thereover, a hinged mounting for said shoe enabling swinging thereof into and out of operative positions relative to the sprocket, means on said shoe limiting movement of the shoe into operative position, and an elongated leaf spring cooperative with the film shoe to maintain it resiliently in either the operative or inoperative positions, and mounted in angular relation to the shoe opposing the body of the latter when in said inoperative position, said means coacting with the spring to restrain the shoe to a predetermined extent of movement into said inoperative position.

4. In combination in a film shoe construction adapted to be associated with a film sprocket, means for hingedly mounting the film shoe at one end to enable opening and closing movement of the shoe relative to the associated film sprocket, an elongated leaf spring mounted adjacent to the hinge mounting of the shoe, said film shoe having an opening therein affording clearance for receiving said spring, and means on said shoe inwardly from the hinge mounting thereof and bridging said opening engaged by said spring, the inter-engagement of the spring and said means being such that the force of the spring against said means exerted on one side of a given plane through the hinge axis causes the shoe to be urged toward the film sprocket, and force exerted by the spring against said means on the opposite side of said plane retains the shoe in an open position.

OTTO R. NEMETH.

REFERENCES CITED

The following references are of record in the file of this patent:

UNITED STATES PATENTS

| Number | Name | Date |
| --- | --- | --- |
| 1,483,319 | Swartz | Feb. 12, 1924 |
| 2,039,182 | Nakken | Apr. 28, 1936 |
| 2,144,210 | Vollenweider | Jan. 17, 1939 |
| 2,205,546 | Stechbart | June 25, 1940 |
| 2,275,262 | Malhiot | Mar. 3, 1942 |
| 1,303,837 | Wyckoff et al. | May 13, 1919 |
| 2,019,260 | Howell | Oct. 29, 1935 |
| 2,037,452 | Boecking | Apr. 14, 1936 |
| 2,228,092 | Sperry | Jan. 7, 1941 |